(12) United States Patent
Braunecker et al.

(10) Patent No.: US 6,426,834 B1
(45) Date of Patent: Jul. 30, 2002

(54) METHOD FOR CORRECTING OPTICAL WAVEFRONT ERRORS AND OPTICAL SYSTEM, SUCH AS A TELESCOPE, PRODUCED ACCORDINGLY

(75) Inventors: Bernhard Braunecker, Rebstein; Massimo Biber, Balgach, both of (CH)

(73) Assignee: Leica Geosystems AG, Heerbrugg (CH)

(*) Notice: Subject to any disclaimer, the term of this patent is extended or adjusted under 35 U.S.C. 154(b) by 0 days.

(21) Appl. No.: 09/502,044

(22) Filed: Feb. 11, 2000

(30) Foreign Application Priority Data

Feb. 13, 1999 (EP) .............................................. 99102937

(51) Int. Cl.⁷ .......................... G02B 23/06; G02B 17/06

(52) U.S. Cl. ......................... 359/366; 359/729; 359/859

(58) Field of Search .................................. 359/365, 366, 359/727, 728, 729, 730, 731, 737, 858, 859

(56) References Cited

U.S. PATENT DOCUMENTS

| | | | | |
|---|---|---|---|---|
| 2,336,377 A | | 12/1943 | Warmisham | |
| 2,344,756 A | | 3/1944 | Warmisham | |
| 4,265,510 A | * | 5/1981 | Cook | 359/366 |
| 4,804,258 A | * | 2/1989 | Kebo | 359/366 |
| 5,142,417 A | * | 8/1992 | Brunn | 359/859 |
| 5,274,406 A | | 12/1993 | Tejima et al. | |
| 5,309,276 A | | 5/1994 | Rodgers | |
| 5,392,119 A | | 2/1995 | McArthur et al. | |
| 5,550,672 A | * | 8/1996 | Cook | 359/365 |

FOREIGN PATENT DOCUMENTS

| | | |
|---|---|---|
| GB | 2283107 | 4/1995 |
| WO | 8805553 | 7/1988 |

OTHER PUBLICATIONS

Greve, "Off–axis aberration of achromatic Schmidt correctors,"Optik 50(3):235–242 (1978), XP–002098285, Stuttgart, DE.
Martin, "Technical Optics," pp. 309–316, The Schmidt Camera, (1950), XP002098287, Sir Issac Pitman & Sons, London.
Abel, "Wide–field correction in reflective Schmidt systems by a nonrotationally symmetric element," Proceedings of the SPIE, (1983) XP–002098286, pp. 232–238, Geneva, CH.
Triller,"Der Schmidtspiegel—ein interessantes optisches Problem," 100(10):455–458, (1992). F&M Feinwerktechnik & Messtechnik, Munchen, DE.
Bottema, "Reflective correctors for the Hubble Space Telescope axial instruments,"Applied Optics 32(10):1768–1774 (1993).
European Search Report, dated Mar. 29, 1999.

* cited by examiner

Primary Examiner—Jon Henry
(74) Attorney, Agent, or Firm—Rothwell, Figg, Ernst & Manbeck

(57) ABSTRACT

In a method for correcting optical wavefront errors in an optical system, the optical wavefront is calculated for different wavelengths and fields of view between the entry pupil (EP) and exit pupil (AP). Any phase differences are compensated by at least one surface (5, 7) compensating the phase differences in the beam path. A particular optical system, expediently in the form of a telescope, accordingly has a beam path which comprises the following: a first reflector (3), arranged along its axis (A), for reflecting a beam (1) incident along an optical axis (O) onto a concave second reflector (4) which throws the beam obtained from the first reflector (3) onto a third reflector (5), from which it is passed to a concave fourth reflector (6) in order to be reflected at an angle with said optical axis (O). Such a means (5, 7) for correcting the wavefront errors is provided in the beam path of such an optical system. The axis (A) of the first reflector (3) can optionally make an angle ($\alpha$) of 0° with the optical axis (O); the means (5, 7) permits the correction of asymmetry errors resulting from the angular position.

7 Claims, 14 Drawing Sheets

METHOD FOR CORRECTING OPTICAL WAVEFRONT ERRORS AND OPTICAL SYSTEM, SUCH AS A TELESCOPE, PRODUCED ACCORDINGLY

The invention relates to a method for correcting optical wavefront errors according to the preamble of claim 1 and to a telescope having the general features of claims 3 and 5.

Optics are often concerned with point-like objects. The classical example is astronomy, where telescopes are used to register virtually point-like star images. Another, modern example is the optical linking of two satellites for the purpose of data exchange. Each satellite transmits laser light of different wavelengths to one or more remote satellites. If the intensity of the light is modulated with the data sequence to be transmitted, the term communication mode is used; if both satellites emit laser light to "find" themselves, the term acquisition mode is used. In both modes, the respective remote satellite appears virtually point-like to the other satellite, owing to the large distances (up to 70,000 km in geostationary orbit).

In both cases, the receiving optical system has to process very low light powers. The optical systems must therefore primarily have high luminous intensity. In the case of point-like objects, the irradiation intensity b at the location of the receiver is given by $$b \equiv W/A = D^2 \cdot \sin^2(\delta) \tag{1}$$

where W is the incident radiant power, A is the area of the diffraction disk, D is the diameter of the entry pupil and δ is the opening angle of the telescope (R.W. Pohl, Einführung in die Physik [Introduction to Physics], Volume 3, page 64). sin(δ) is referred to as the numerical aperture NA of the telescope, which is derived from the F number $$F_\# \equiv F/D \tag{2}$$

using the focal distance F according to the relationship $$NA = 1/(2 * F_\#) \tag{3}$$

Systems having high luminous intensity and intended for quasi-point-like objects are thus distinguished by a large diameter D or by a large numerical aperture NA or by both.

In astronomy, the approach of choosing D to be very large is adopted. The large 8 m telescopes on Mount Palomar and other astronomical centers are known. Although for reasons of technical feasibility the numerical aperture must be kept small, the gain in luminous intensity is considerable. Owing to the small numerical aperture, according to (3) the focal distance is correspondingly increased and hence also the telescope dimensions. Above a certain diameter—typically above 30 cm—it is possible only to use mirror systems since lens systems can no longer be expediently produced.

The second major advantage of reflecting mirror systems over optically refracting lens systems is their freedom from chromatic aberration. An optically corrected mirror system can thus be used both in the UV range and far into the infrared range, which is of decisive importance especially for astronomy.

On the other hand, the disadvantage of mirrors is the small field of view of only a few degrees, whereas lens systems in turn can be designed to be extremely wide-angled (cf. fisheye systems with fields of view>180°). In astronomy, this disadvantage is overcome elegantly but in a very expensive manner by enormous mechanical tracking units in order to achieve a large celestial field of view.

Historically—and also as a rule also today—lenses and mirrors having a spherical surface are produced; a production process developed to maturity over centuries. If it is necessary to position a plurality of spherical mirrors one behind the other, as in a telescope—these should have a common or optical symmetry axis ("on-axis" arrangement). If this is not the case, the result may be deteriorations in the imaging quality. In the "on-axis" mode, however, the problem of internal obscuration arises, leading on the one hand to losses of light and on the other hand—often worse—to troublesome diffraction artefacts. Diffraction artefacts adversely affect the image quality in imaging telescopes whereas, in the case of space telescopes, they lead to an undesired beam expansion and hence to critical energy losses at the remote satellite.

However, the obscuration can be avoided if the mirrors are operated "off-axis". Consequently, a normal, rotationally symmetrical "parent" mirror is first produced but only a generally round section thereof remote from the optical axis is used. However, this results in image deterioration, the compensation of which is also the object of the present invention.

Aspherical mirrors are more difficult to produce than spherical mirrors. For very high quality requirements, however, aspherical mirrors are indispensable. In the case of aspherical shapes, a distinction is made between "conical" mirrors, such as paraboloids of revolution, ellipsoids of revolution or hyperboloids of revolution, and more complex, nonconical aspherical shapes. The degree of difficulty increases sharply in the case of the latter, particularly in the case of mirrors of large diameter and low F numbers. From F numbers of less than 2, moreover, the measurement and testing equipment has to meet very high requirements.

In satellite communication, the situation is completely different from that in astronomy. Here, primarily the telescope dimensions and the weight have to be minimized; they are essentially responsible for the high costs. A satellite telescope therefore consists predominantly of systems of smaller dimension. Mirrors are chosen since, when constructed in the highly developed lightweight construction method, they can have a significantly lower weight than optically equivalent lens systems. Lens systems are moreover very problematic for space flights since it is necessary to take expensive protective measures to prevent fogging of glass in the lenses, which is caused by the high-energy cosmic radiation.

A further advantage of mirror systems is that the volume occupied can be minimized if the mirror arrangement is "nested" in an appropriately skilled manner. However, nesting is already a necessity in the "off-axis" systems described above, but it has even further advantages:

On the one hand, a compact arrangement makes the optical system thermally more stable. Since satellites are exposed to extreme temperature differences, the following design rule is applicable: the smaller the dimension, the smaller the defocusings of the optical system which are caused by the thermal expansion of the mechanical structure. Defocusing of only a few μm can lead to unacceptable wavefront deformations.

Designers must furthermore minimize the natural vibrations of the satellite. A vibrating satellite results in a dramatic deterioration in the "pointing" stability of the optical connection: this is understood as meaning that, owing to the large distances, vibrations cause intensity variations at the location of the remote satellite. Intensity variations in turn influence the error rate of the data transmission (bit error rate) and must be compensated by an undesired reduction in the data rate. The vibrations are due to the lack of a mechanical fixed point in the orbit. Thus, each new orientation of the satellite must be mechanically opposed, i.e. it must be actively damped. This leads to control sequences which, particularly in the vicinity of natural frequencies of the structure, become very complicated. Here too, the following is therefore applicable: the smaller the size, the easier the stabilization. The manner in which vibrations are rated as critical is evident from the fact that the tolerance for the pointing stability is specified as typically 50 nanorad, i.e. a hundredth of an arc-second (!!).

There are two possibilities for transmitting sufficient optical power to the remote satellite, in spite of the small mirror diameter: powerful laser light sources are used and the numerical aperture NA of the telescope is increased according to (1).

A large NA is almost always necessary since, in addition to the pure communication and acquisition with well collimated laser light, many satellites also have to "operate" in an optically passive manner, i.e. quasi-astronomically. Thus, a satellite registers continuously selected star images according to which it orients itself in three dimensions if it has to be brought into a new position in the so-called "pointing" mode. For safety and cost reasons, however, the same telescope optical system is used for the communication, acquisition and "pointing" channel.

The following modes are thus performed by a modern space telescope:
The optical communication is effected at 1064 nm in the bidirectional "send & receive" mode, with a small field of view, e.g. of 0.1°, very high wavefront quality (<$\lambda$/30 rms) and high data rate (>10 Gbyte/sec). The optical acquisition is performed at (800–900 nm), likewise in the bidirectional "send & receive" mode, with a relatively large field of view of 3°, wavefront of normal quality (<$\lambda$/10 rms) and average data rate (50–100 kbyte/sec). Finally, the so-called optical "pointing" is performed in the passive "receive" mode, likewise with a large field of view of 3° and a wavefront of normal quality (<$\lambda$/10 rms) but with a broad spectral correction (500–1000 nm).

This means that mirror systems for space applications in the communication sector are of relatively small diameter (200–300 nm) and large numerical aperture. For weight and stability reasons, they must be nested in a mechanically highly complex manner. The optical quality must be very good for the communication, acquisition and "pointing" channel, i.e. diffraction-limited.

Such an optical system or telescope is disclosed, for example, in U.S. Pat. No. 5,309,276. The telescope is described very generally herein without the demanding requirements of practice, in particular of space flight, being taken into account.

On the one hand, the space required is relatively large since the primary mirror and the secondary mirror have a common optical axis, i.e. are not optimally folded in the context of the above design. In order, nevertheless, for a certain field of view, to guide the beam from the primary to the secondary mirror without cutting, the secondary mirror must be relatively far away from the primary mirror. As mentioned above, this is disadvantageous if large temperature variations are expected in the operating mode. Furthermore, this unnecessarily enlarges the unused central zone of the primary mirror operated "off-axis", which requires a large diameter of the "parent" mirror. In order nevertheless to reduce the dimension of the telescope, the "parent" mirror was designed with an F number≈1. This can be realized in practice for the stated magnitude of the diameter only at very great expense, owing to the very narrow manufacturing tolerances. In the case of this F number, furthermore, the testing technology has to meet very high requirements.

The publication also notes that, in the case of an inadequate wavefront quality, all mirrors can be given an asphericity higher than conical. However, in the case of large mirrors, this is a more expensive and technically very uncertain variant.

Another disadvantage is that the small mirror M3 can be kept planar only with an afocal magnification $\Gamma$=6.5. At other magnifications, it must be made concave or convex, which on the one hand further increases the costs but on the other hand also complicates the adjustment of the entire system.

If all the disadvantages are combined, the present variant proves to be a nonoptimized, inflexible, sensitive and expensive solution. It is therefore not suitable in practice in this form.

The object of the present invention is to overcome these restrictions and to permit the construction of compact, wide-angle and obscuration-free systems which have high luminous intensity and meet practical requirements. It is intended to find an optical solution which meets the abovementioned, demanding requirements, some of which are contradictory. It will be shown that this can be carried out according to the invention in a stable and economic manner by means of a single correction surface.

Accordingly, it is initially the object of the invention to provide an optical system, in particular a telescope, which is corrected in a simple manner, or a telescope which also meets practical requirements with substantially smaller dimensions, lower weight and lower costs. This is achieved in a surprisingly simple manner by the characterizing features of claims 3 and 5, respectively.

An optical system according to claim 3 even permits an optimal correction if, as in the case of space telescopes, satisfactory operation is required simultaneously in a plurality of optical channels. As mentioned above, the optical requirements of communication differ from those for acquisition and for "pointing". Nevertheless, it is easily possible in the manner according to the invention simultaneously to perform a correction by means of a single correction surface, which to date has been possible only by making compromises.

As is evident from the defining clause of claim 6, one object of the invention is first achieved by accepting an optical error, which however is eliminated again by the measure stated in the defining clause of claim 5, so that in the end only the advantages of the first measure remain. In addition, an initially unexpected additional effect has resulted, namely that the third reflector can be kept planar also in the case of afocal magnifications which are greater than 6.5. Of course, this makes a significant contribution to cost reduction and to simplification of production.

The method developed for producing a correction in such a telescope is expediently that according to claims 1 and 2, and it has been found—quite independently of the optical system to which it is applied—that a number of errors which adversely affect the wavefront can in principle also be eliminated therewith. Thus, residual aberration errors of the design, caused by the shape, position and tilting of the off-axis aspherical shapes, can be eliminated. Furthermore, it is possible and also required in practice, to compensate residual polishing and assembly errors of the optical components. The correction measure is derived from the measured values, and it is for this reason that the invention also relates generally to an optical system as claimed in claims 3 and 4.

It has been found that tilting of the first reflector by the angle stated in claim 7 is capable of keeping the asymmetry error within controllable limits, which is why such a tilt is preferred. It is in turn surprising that only a relatively small tilt of, for example, 1°, at which the asymmetry error is very small, is capable of delivering the advantages mentioned at the outset, and it is therefore certainly no small merit of the present invention to have recognized this. A tilt of only, for example, 30 arc-seconds can result in a substantial improvement.

According to claim 4, the correction is preferably made on the third reflector, because this will in general be smaller than that of the first and the fourth reflector and optically also less sensitive, and is close to the intermediate focal plane and not too far away from the plane of the pupil. It can thus be used both for correcting focal plane errors and for correcting pupil errors. In addition, the third reflector in an embodiment according to the invention may be planar.

The manner in which an asymmetry error is eliminated in practice is per se within the capabilities of an average skilled worker in the area. However, a procedure according to claim 4 involving a polynomial formulation is preferred.

A criticism above of the prior art was that the "parent" mirrors have an F number of 1. In the invention, the measures according to claims 5 and/or 6 can be particularly easily realized.

To limit the asymmetry error, it is advantageous if the features of claim 7 are realized.

For this purpose—for example for a telescope according to the invention, the first, second and fourth reflectors are calculated so that their "parent" mirrors do not fall below the F number of 1.5, which is still acceptable in terms of manufacture.

Reflectors operated "off-axis" (the first, second and fourth reflectors) are tilted relative to one another. On the one hand, this results in a compact assembled volume and, on the other hand, the wavefront errors introduced by the "off-axis" mode can already be partially compensated.

The remaining errors are corrected by the aspherical shape of the mirror surfaces. Once again for reasons of greater feasibility, the three large mirror reflectors (the first, second and fourth reflectors) are designed as purely conical mirrors, while the third reflector is designed as a pure plane mirror. For reasons of flexibility, this should be applicable for a large afocal magnification range $\Gamma=4-15$. The plane mirror (the third reflector) can, according to the invention, have a reflecting phase plate which possesses a structured surface and with which the final fine correction of the optical wavefront is achieved. The phase plate can also be introduced as a transmitting glass plate close to the third reflector.

The production of such a structured plate is permitted by new technical possibilities for mechanical surface processing in order to polish and to measure mirror surfaces having any desired depth profile in optical quality.

However, it can also be designed as a diffracting element in the form of a hologram. The hologram can then be cemented to the planar surface of the third reflector element.

Providing additional degrees of freedom of the mutual tilting and of the phase correction plate, it is possible to find, for a large range of the afocal magnification, solutions which significantly improve the wavefront quality. All these solutions fulfil the technically important general condition that the exit pupil AP is mechanically accessible outside the telescope.

Further details of the invention are evident from the following description of embodiments shown schematically in the drawing. The correction measures by means of a correction plate are shown by way of example in FIGS. 1 to 8, and those by means of correction measures [sic] on a reflection element are shown in FIGS. 9 to 15.

Figure 2:
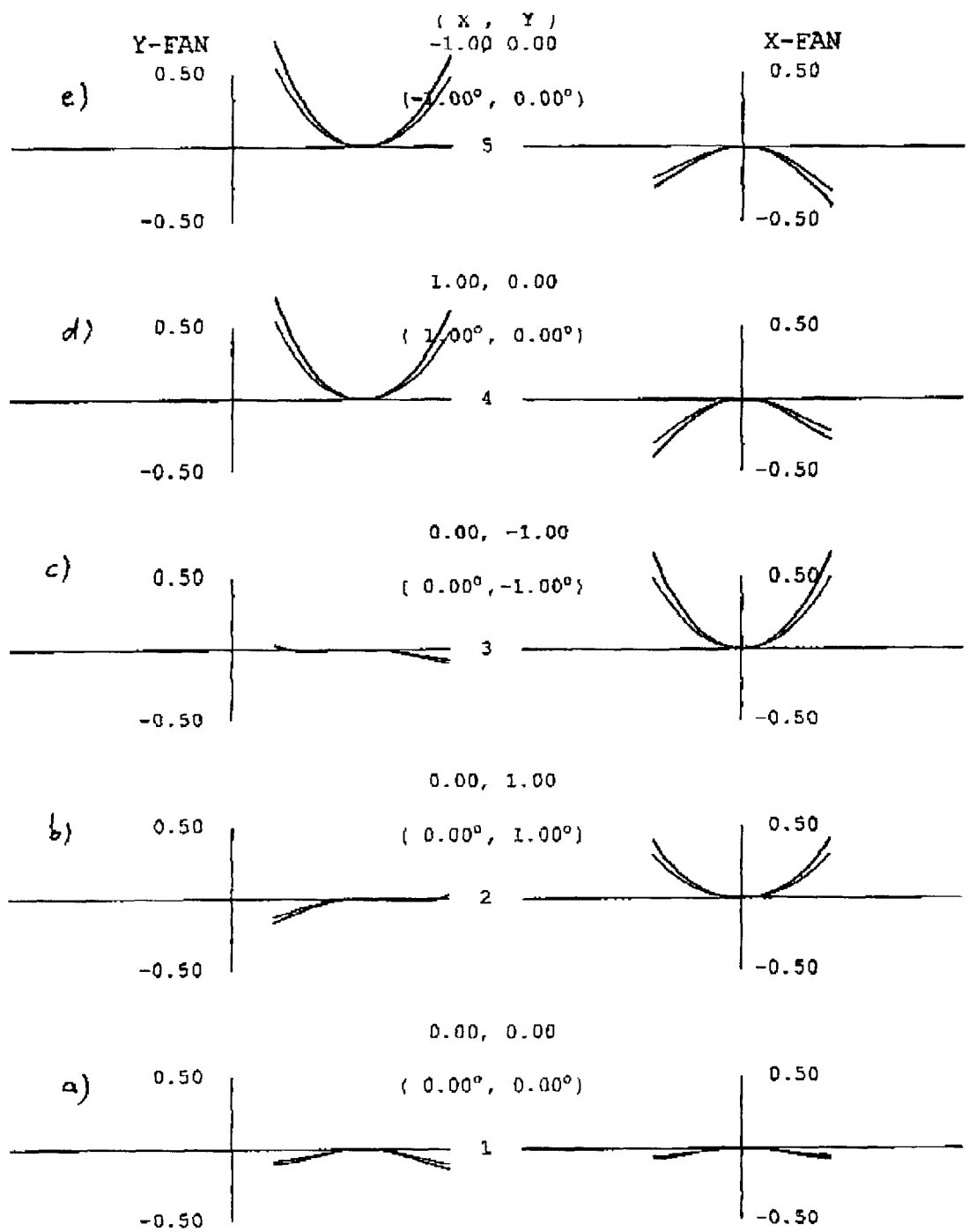
FIG. 2 shows the wavefront deformation, expressed in units of the wavelength $\lambda$, in the exit pupil AP of the uncorrected system of FIG. 1 for a larger field of view (optionally in the acquisition channel) in the x and y directions for various field angles and wavelengths.
Figure 9:
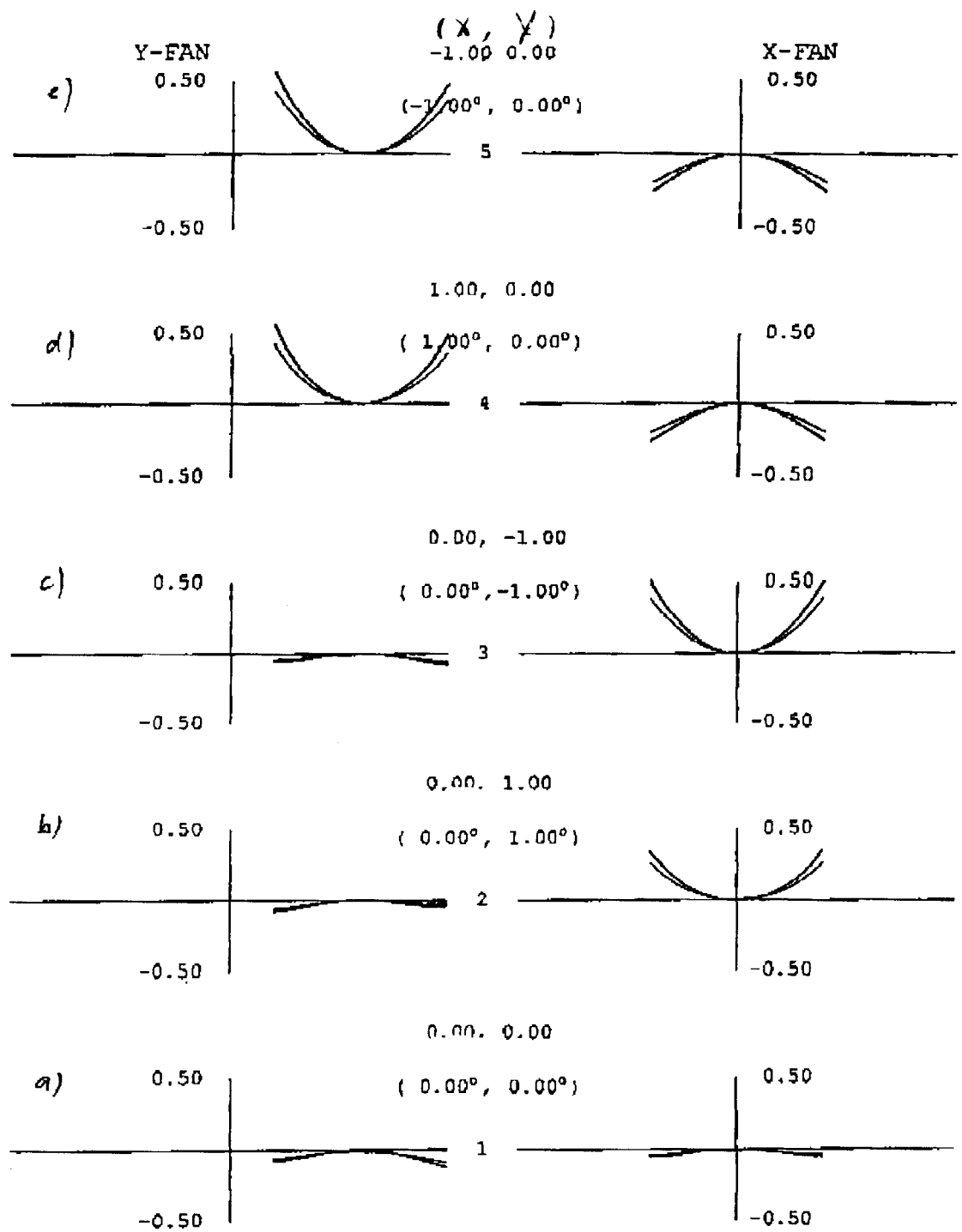
Figure 10:
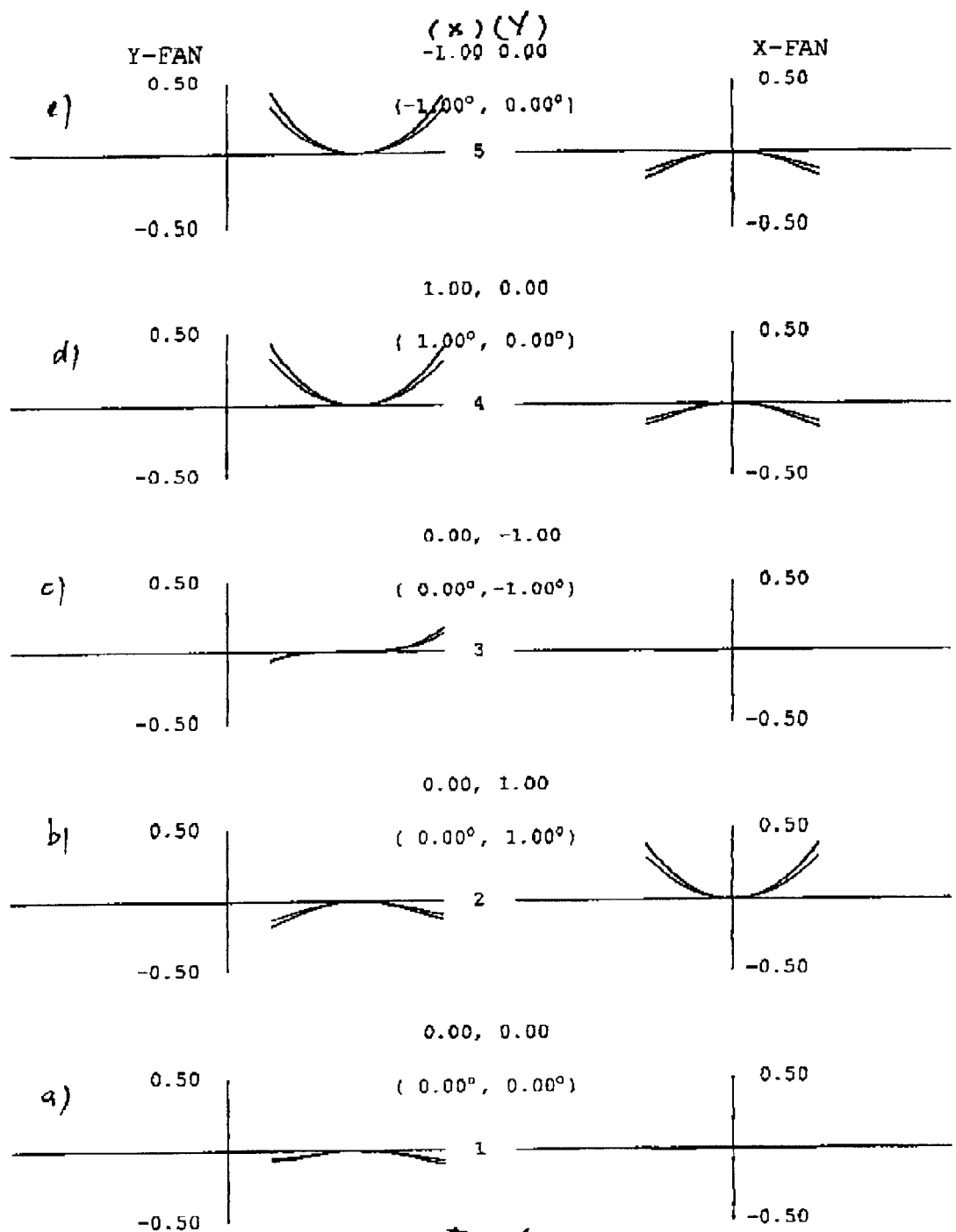
Figure 11:
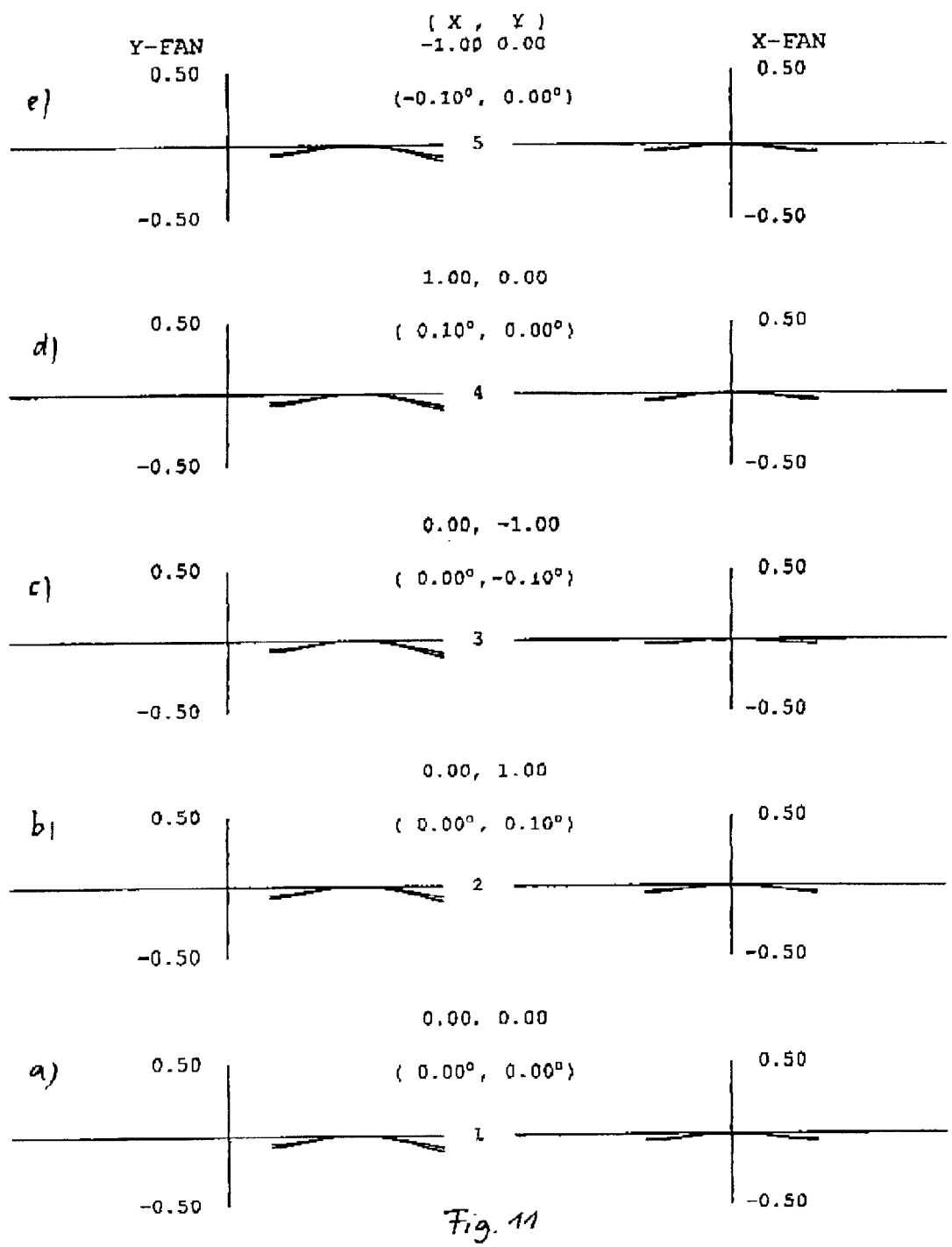
Figure 12:
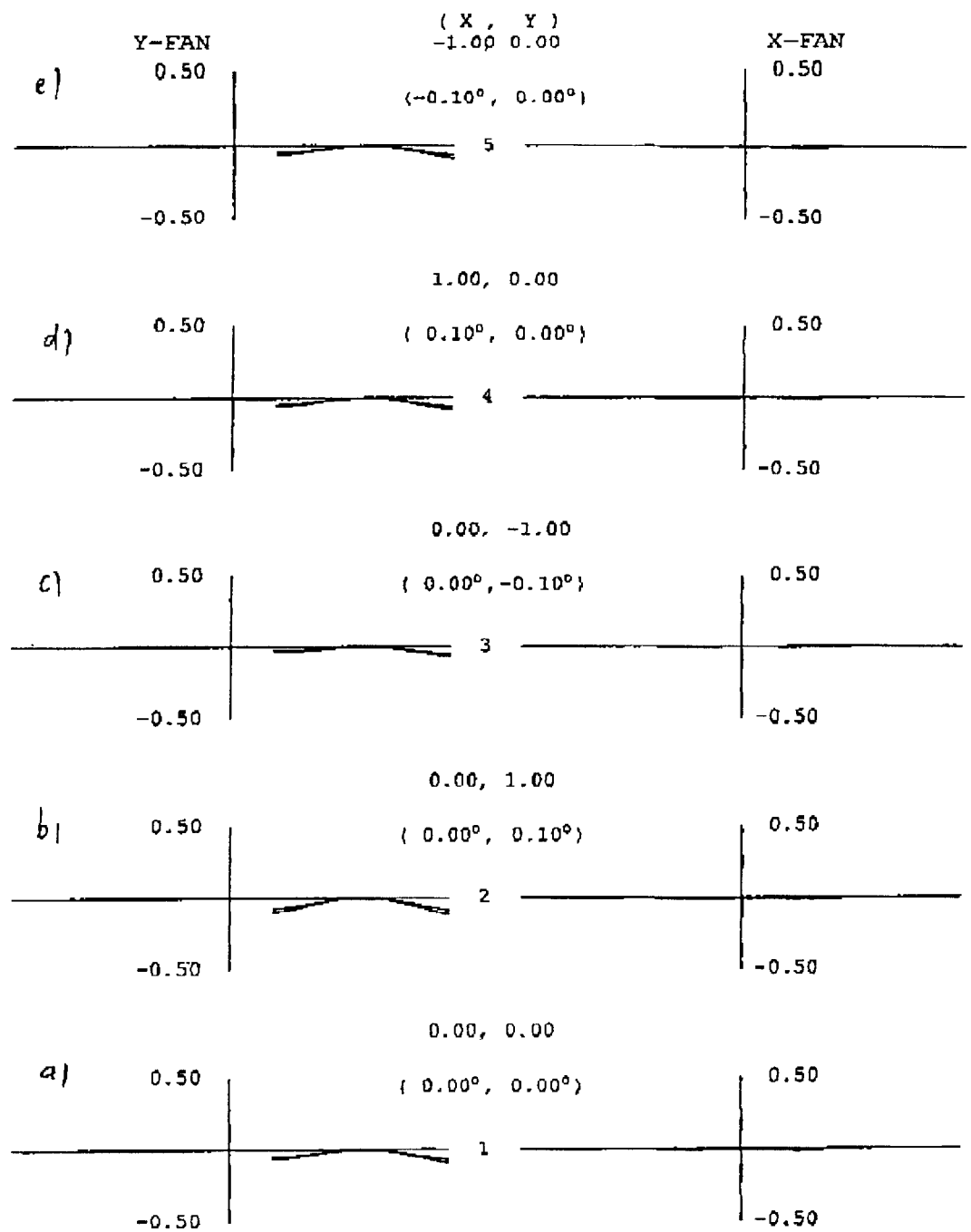
Figure 13:
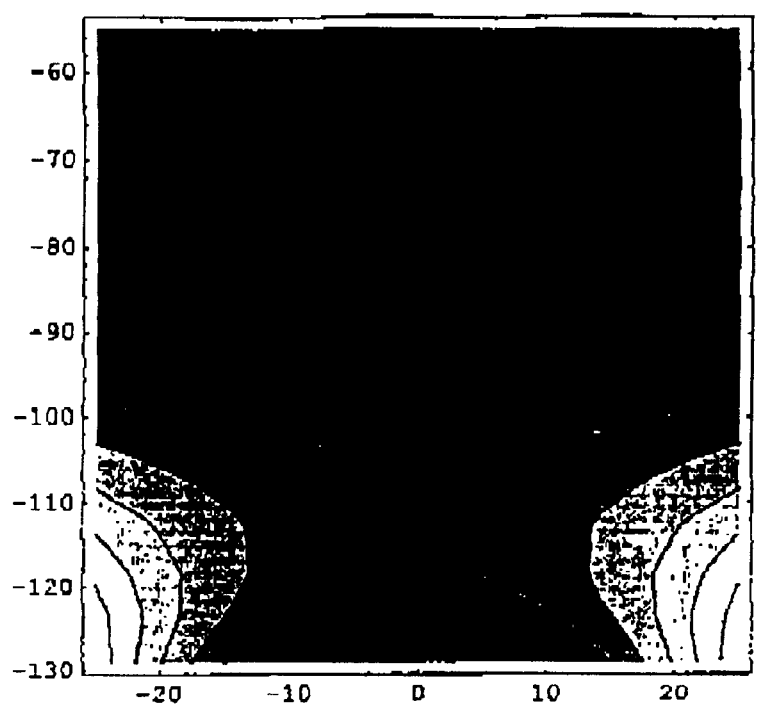
Figure 14:
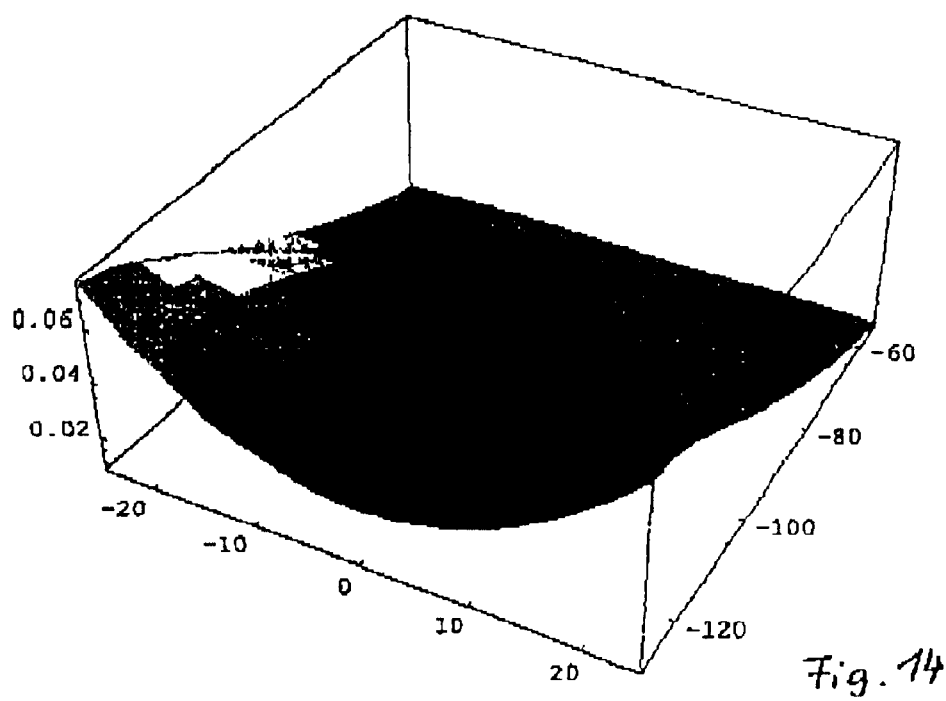
Figure 15:
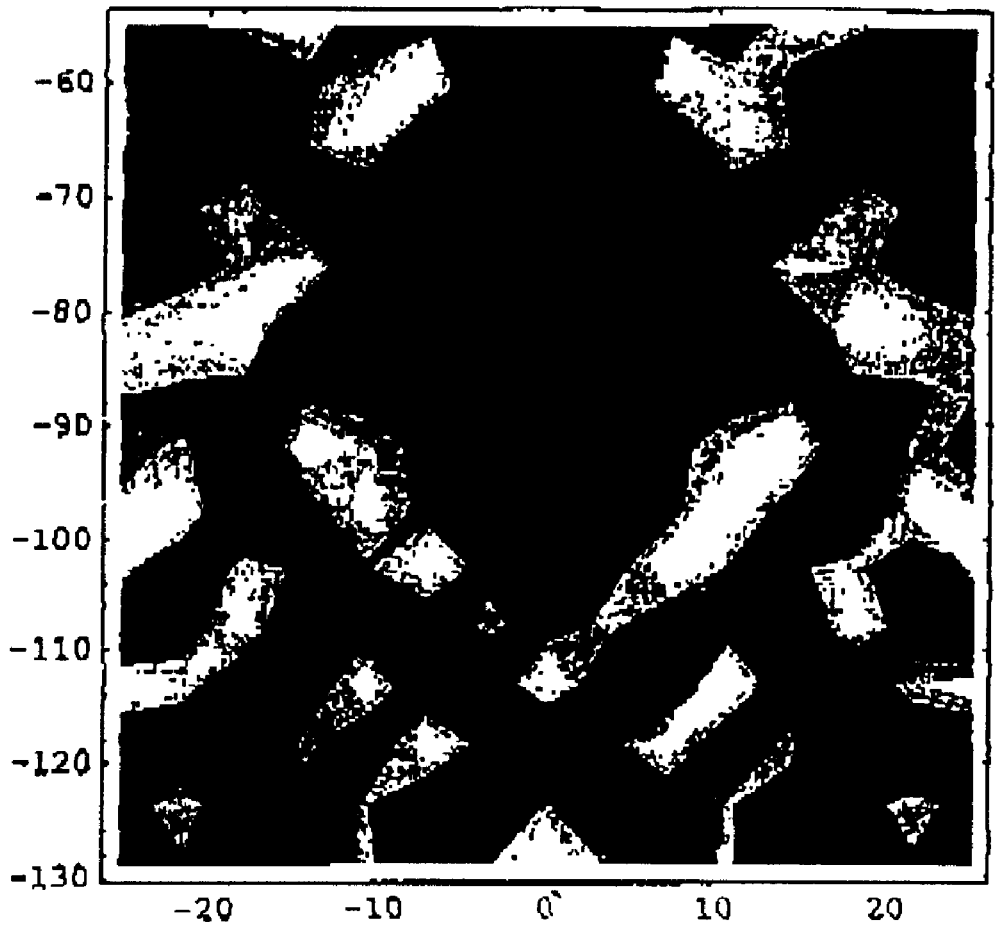

FIG. 9, similarly to FIG. 2, shows the wavefront deformation in the exit pupil of the uncorrected system for a larger field of view (acquisition channel) but for a system with lower magnification;

FIG. 10 is similar to FIG. 9, but for the system corrected according to the invention by means of correction measures on the third reflector;

FIG. 11 shows a diagram, corresponding to FIG. 9, for a smaller field of view (communication channel);

FIG. 12 is similar to FIG. 10, but for the system corrected according to the invention on the third mirror;

FIG. 13 shows the surface profile $\Delta z$, in mm, of the essentially planar surface of the third reflector in the z direction of view;

FIG. 14 shows a diagram of the surface profile $\Delta z$ of the essentially planar, third reflector in a perspective, greatly exaggerated view and FIG. 15 shows the phase function for a surface of the third reflector, which surface has a hologram and by means of which surface a correction corresponding to FIG. 10 or 12 is effected.

Figure 1:
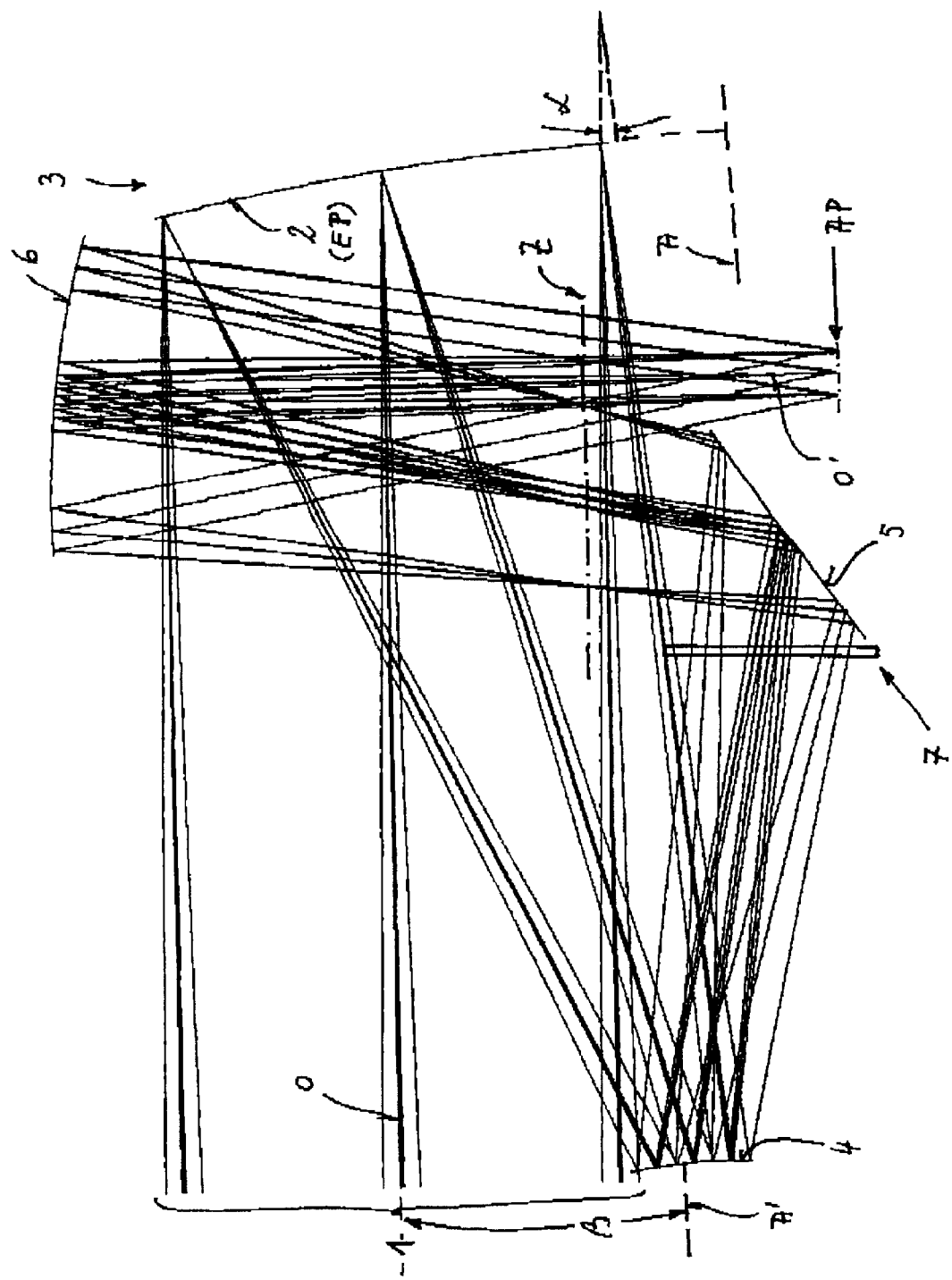
FIG. 1 shows an embodiment for setting up an optical system according to the invention, comprising a correction plate arranged close to the third reflector.

According to FIG. 1, a beam 1 is incident along an optical axis O and strikes the concave mirror surface 2 of a first reflector 3 whose axis A makes an angle $\alpha$ with the optical axis O. Of course, this means that there must be an asymmetry error because—based on FIG. 1—on proceeding along the mirror surface 2 from top to bottom, this surface 2 becomes increasingly more distant from the focal plane of the incident beam 1. This distance can of course be kept very small if the angle $\alpha$ is kept very small, and it would be presumed that such tilting of the reflector 3 about the angle $\alpha$ would then scarcely have an marked positive effect. However, the following description will show that this is not so.

As in the prior art, the mirror surface 2 reflects the beam onto a second, convex reflector 4. It has been found that the asymmetry error resulting from the tilting of the reflector 3 about the angle $\alpha$ can be reduced if the axis A' of the second reflector 4 also makes an angle $\beta$ with the optical axis O, the two angles $\alpha$ and $\beta$ in practice expediently being of the same magnitude. Of course, the system could be constructed all the more compactly the larger the angles $\alpha$ and $\beta$, but the resulting asymmetry error must also still be controllable, i.e. must be capable of being easily corrected. It has been found that it is expedient to limit the magnitude of the angle α to at least 30°, preferably to 10°. In particular, it should be less than 5°, i.e., for example, about 1°. It should also be mentioned that the F number of the "parent" mirror of this second reflector 4 should as far as possible be greater than 1 and expediently greater than 1.5, in order to simplify its producibility. An F number of 2±0.3 will in practice meet all requirements.

From the second reflector 4, the beam is thrown onto a third reflector 5 which, together with a fourth reflector 6, deflects the beam in such a way that the plane AP of the exit pupil is finally aligned approximately parallel to the optical axis O, i.e. that the deflected optical axis O' is approximately perpendicular to the optical axis O of the incident beam 1. This is important particularly for applications in which the optical telescope system according to the invention (also to be referred to as "diffraction-limited skew reflector") is to be installed in a theodolite-like structure. This is because the beam can be coupled into or coupled out of the axis of tilt of the structure in this way. The combination of concave mirror surface 2 and convex reflector 4 results in an intermediate focal plane Z close to the third reflector 5.

In the beam path shown in FIG. 1, a correction for aberration—in particular for the asymmetry error occurring through the tilting—should and must now be made. There are per se various possibilities for this purpose. It has already been mentioned that, owing to the skew position of the axis A and hence of the entry pupil EP, asymmetry errors of the wavefront are produced on the surface 2. A first possibility would therefore be to mount a lens of such aspherical shape (or a corresponding optical member) in front of the reflector 3 in order to correct this asymmetry error. Owing to the size of the EP, this measure is not however optimal and it would also be necessary to accept other errors thereby, which is why such a possibility, feasible per se, is of just as little interest as a correction on the mirror surface 2 or on the reflector 4. On the other hand, a correction in the region of the third reflector 5 is optimal because this will generally be smaller than the first and the fourth reflector 3 and 6, respectively, and it would also be optically not too sensitive, and has a good position close to the intermediate focal plane Z and not too far from the plane AP of the pupil. This means that advantageously the correction discussed later is preferably performed either on the third reflector 5, where the handling will be particularly simple owing to the permitted planar design, or by inserting a thin, plane-parallel correction plate 7 in the region of the reflector 5.

It is remarkable that, as a result of tilting about the angle α (and optionally also β), it is ensured not only that the optical components can be brought closer together so that the setup becomes more compact, but that this can result in a completely planar shape of the third reflector 5, which then need have only a particular surface design if the abovementioned wavefront correction is to be performed on it (as shown in FIGS. 9 to 15 further below). However, this design as a plane mirror does of course also lead to a reduction in the total costs. Moreover, the parent reflectors 3 (concave) and 4 (convex) can have an F number greater than 1. The examples and calculations described below are based on an F number of 1.7 and an angle a of tilt of only 1°.

The diagrams of FIGS. 2 to 8 are based on a system corresponding to FIG. 1 with a magnification Γ≅10.

If FIG. 2 is now considered, it represents a first example of an intermediate result in carrying out the invention with respect to the achieved wavefront quality, namely the effect of positioning the axis A of the first reflector 3 skew or tilting said axis A, relative to the optical axis O through an angle a without correction thereof. FIG. 2 shows a plurality of diagrams in planes one on top of the other. The right column of FIG. 2 shows the aberrations of the wavefront along the horizontal (x) pupil meridian and the left column shows the aberrations of the wavefront along the vertical (y) pupil meridian. FIG. 2*a*) shows the aberrations (optical path differences) for wavelengths of 1064, 824, 811 and 798 nm with field angles X and Y of a relative field of 0.00° in both axial directions. FIG. 2*b*) represents the aberrations at X=0.00° and Y=1.00°, FIG. 2*c*) the aberrations at X=0.00° and Y=−1.00°, FIG. 2*d*) the aberrations at X=1.00° and Y=0.00° and FIG. 2*e*) finally the aberrations at X=−1.00° and Y=0.00°. As can be seen, wavefront deformations of max. 0.8 λ are found, which is far outside the specifications of typically λ/8 pV or equivalent to λ/24 rms.

These wavefront errors can now be reduced by inserting a correction plate 7 having an appropriate surface structure. For this purpose, an optimization calculation must be performed. The optimization of optical systems is one of the tasks which must be performed virtually daily by a person skilled in the art of optics, so that there is no need to discuss it in detail here. In any case, the optical path lengths from the entry pupil EP at the primary mirror 3 to the exit pupil AP are calculated for a very large number of light beams and represented as a wavefront. Its deviation from the ideal plane is the quantity which has to be minimized. This is now done by varying all free design parameters, such as radii, distances, tilts, decenterings, etc., of the mirrors, and additionally now by varying the surface profile of the correction plate 7 or (see below) of the reflector 3.

Figure 3:
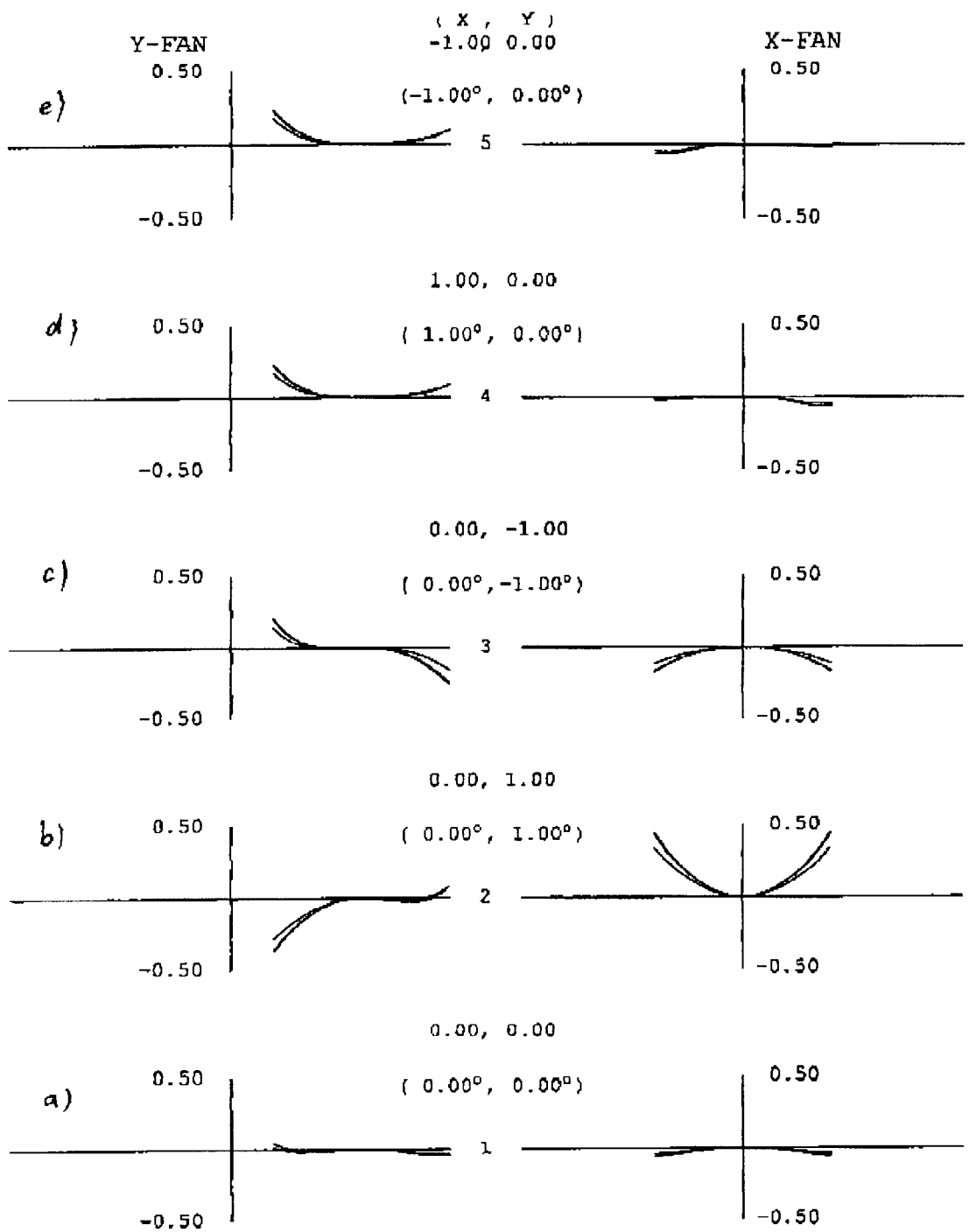
FIG. 3 is similar to FIG. 2, but for the system corrected according to the invention by means of a correction plate.
Figure 4:
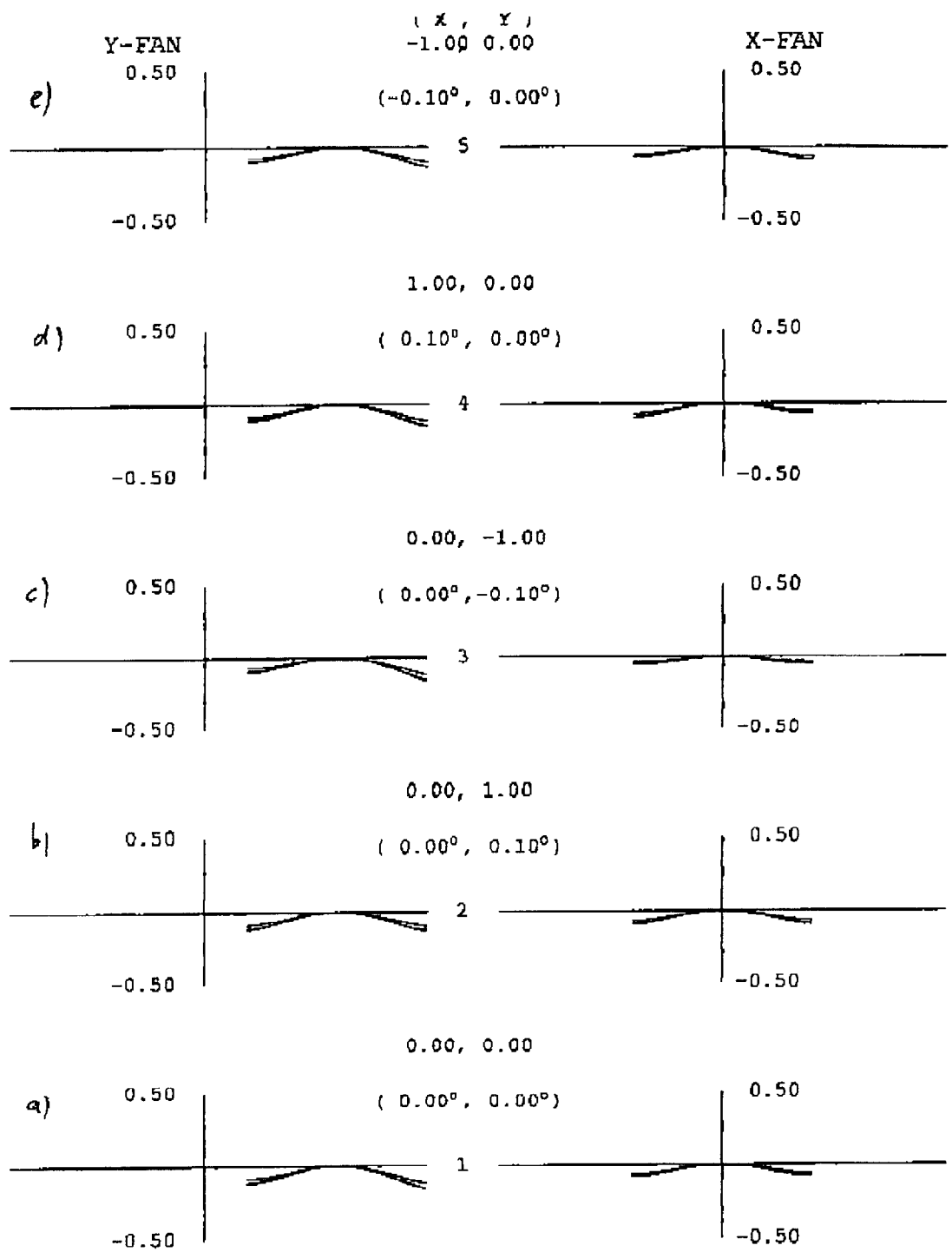
FIG. 4 shows a diagram, corresponding to FIG. 2, for a smaller field of view (optionally in the communication channel)
Figure 5:
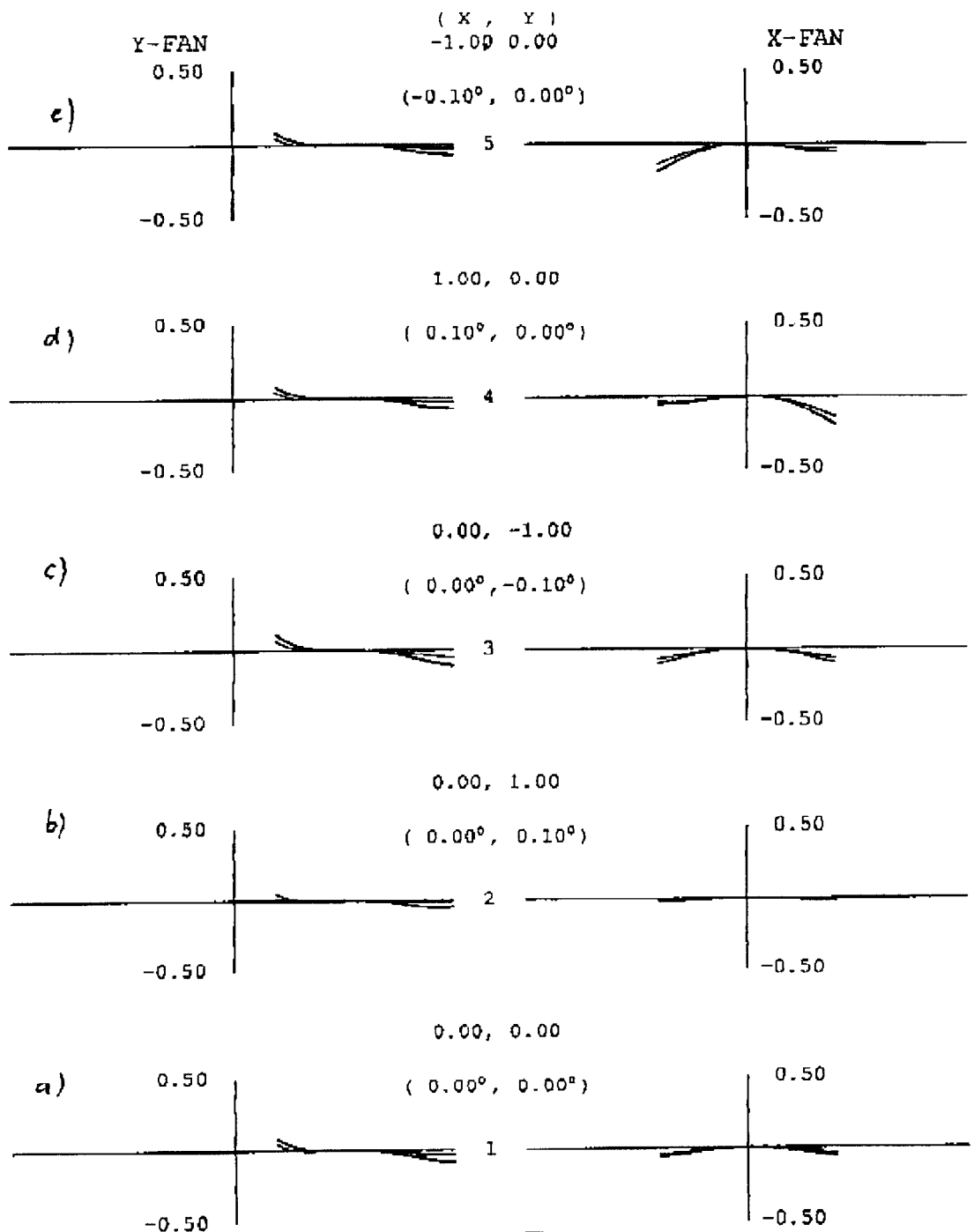
FIG. 5 is similar to FIG. 4, but for the system corrected according to the invention by means of a correction plate.
Figure 6:
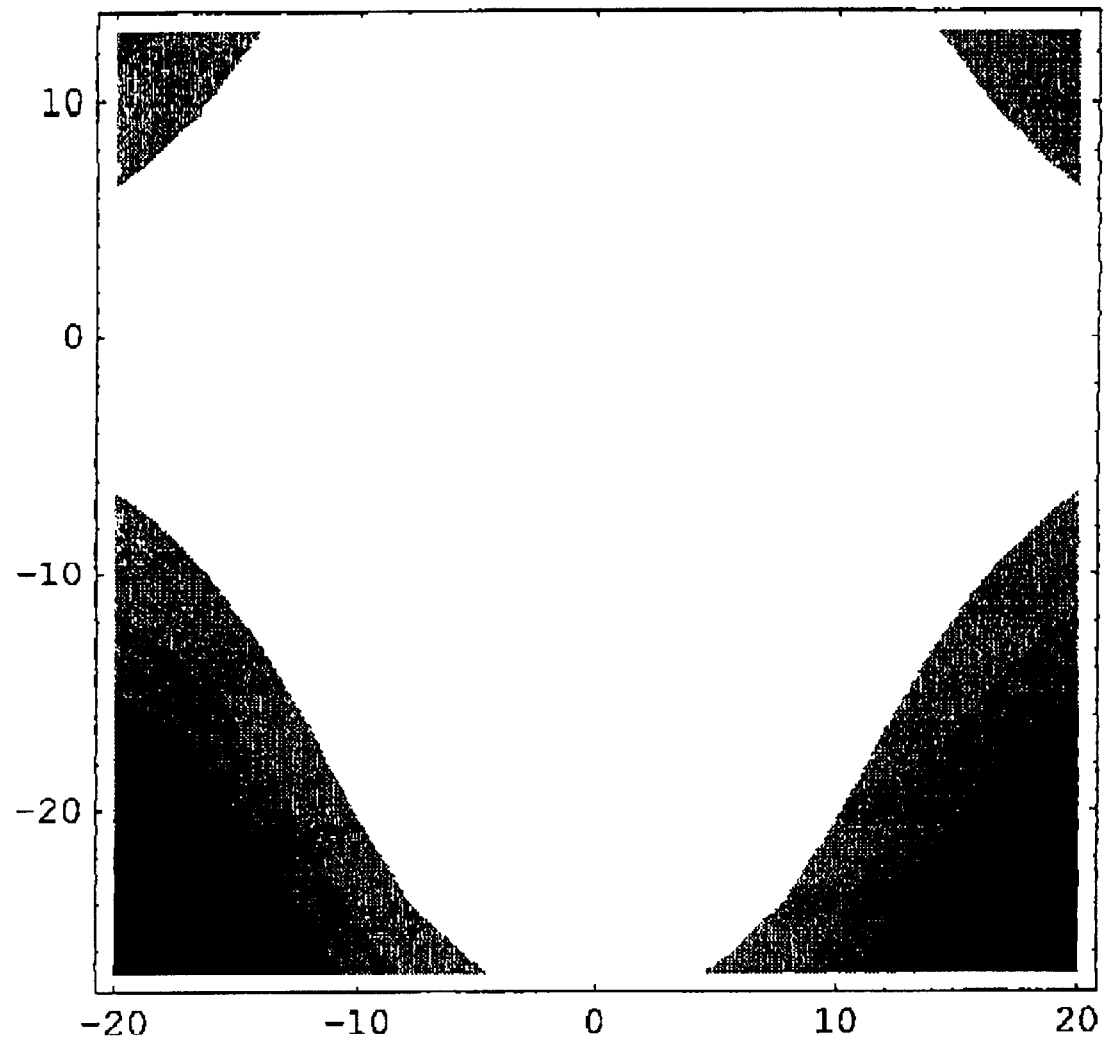
FIG. 6 shows the surface profile $\Delta z$ of the correction plate in the z direction of view.
Figure 7:
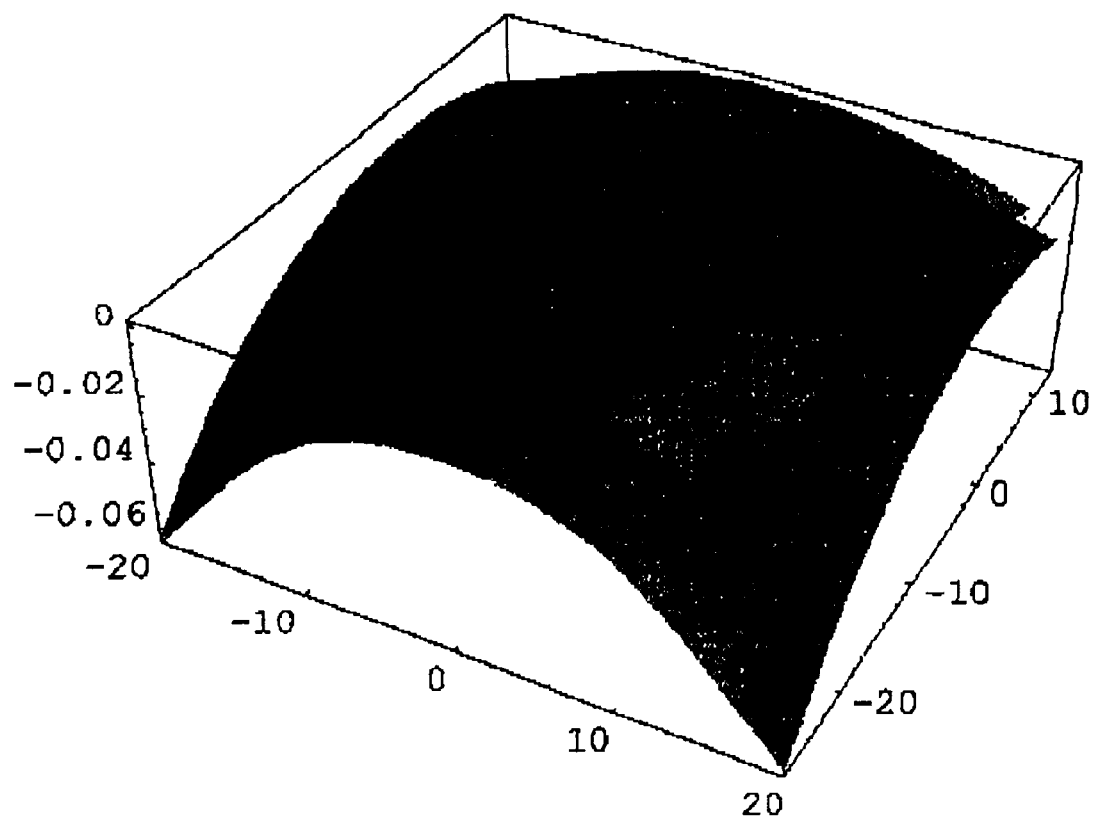
FIG. 7 shows a diagram of the surface profile $\Delta z$ of the correction plate in a perspective, greatly exaggerated view.

On the basis of this optimization, an image according to FIG. 3 and corresponding with regard to the arrangement of the diagrams of FIG. 2 is obtained. A comparison with FIG. 2 shows that all wavefront aberrations have been significantly reduced. A similar comparison can be made on the basis of FIGS. 4 and 5 for a smaller field of view, for example with the communication channel. Here, the improvement does not appear so spectacular at first glance, which is due to the fact that the system is already precorrected. Here too, however, it has been possible to achieve a substantial improvement which is evident to a person skilled in the art and is all the more important if, for example for the requirement of a communication channel, the specifications are narrower. It should be noted that improvements have been achieved in both physically differently defined and specified channels by means of the same correction element. The surface profile of the resulting surface of the transmitting correction plate is shown in FIGS. 6 and 7 (the latter has a greatly exaggerated view) The scale along the vertical axis is stated in millimeters.

Figure 8:
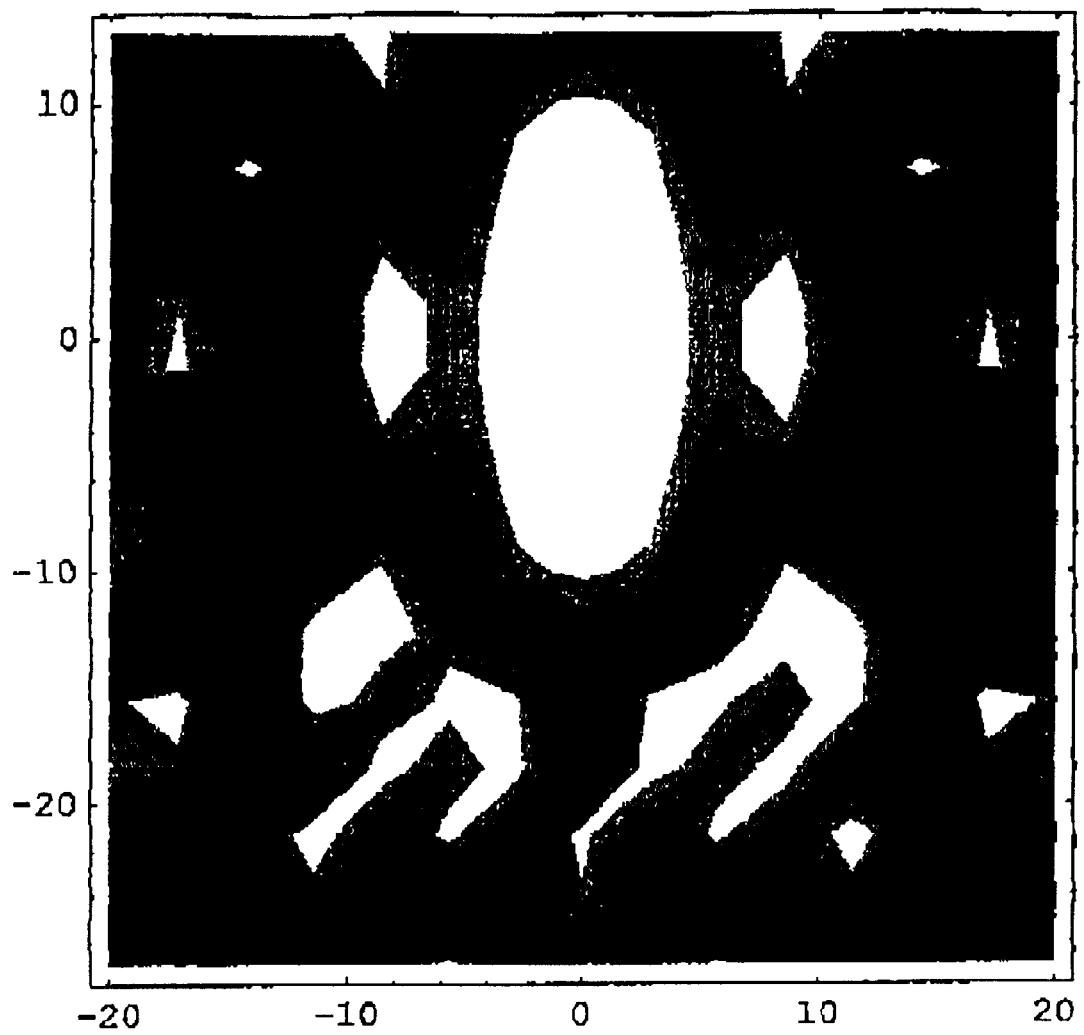
FIG. 8 shows the phase function for a correction plate which has a hologram and effects a correction corresponding to FIG. 3 or 5.

There is alternatively also the possibility of influencing the wavefront not only by means of refraction but also by means of diffraction. This is possible by means of a particular optical element, a hologram. It is incorporated into the planar surface of the transmitting plate 7 or stuck on or cemented on as a thin film (transmission hologram) or incorporated as a reflection hologram in an analogous manner into the planar surface of the reflector 5. FIG. 8 shows the hologram phase function in plan view for the transmission hologram, and FIG. 15 shows said function for a reflection hologram.

The following diagrams of FIGS. 9 to 15 are based on a system corresponding to FIG. 1 with a smaller magnification of Γ≅8.5. Here, the correction measures are applied directly to the third reflector 5, i.e. without insertion of a correction plate.

For this purpose, to ensure that the wavefront is modified in the desired manner, a correction is made to the essentially planar surface profile of the third reflector. Thus, the diagrams in FIG. 9 and 10 once again show the wavefront of the optical system in the uncorrected and in the corrected state for a larger field of view corresponding to the acquisition channel. Here too, the improvement is clearly evident. The surface profile of the third reflector 5 is shown in FIGS. 13 and 14, in a manner corresponding to the diagrams of FIGS. 6 and 7. FIG. 14 shows the surface structure in perspective, greatly exaggerated view. In the same manner as shown in FIG. 8 for a correction plate, the surface of the third reflector can also be provided with a hologram structure. Such a structure is shown in FIG. 15—for the surface of the third reflector 5.

The surface profile can be incorporated, for example etched, into the surface of the reflector 5, or stuck or cemented as a separate, reflective component onto the planar reflector surface.

The following Examples indicate the correction functions for the creation of the surface profile $\Delta z$, whether for transmitting correction plates, reflective correction measures at the surface of the third reflector or by an additional correction measure, acting by diffraction, on the transmitting correction plate. The compensating surface has a phase structure which is described by $\Phi=(2\pi/\lambda)\cdot a\cdot b\cdot \Delta z$. The factor a is dependent on whether the surface in question is a transmitting or a reflecting surface, and the factor b determines the respective mounting position of the surface.

EXAMPLE 1

A 3 mm thick plane-parallel glass plate which faces the second reflector is brought into the beam path as plate 7 according to the diagram of FIG. 1. Its surface profile $\Delta z$, i.e. the depth deviation from the plane, will be described as a function of the positional coordinates by a polynomial, in particular by the following polynomial $$\Delta z = AR\cdot[(1-AP)\cdot x^2+(1+AP)\cdot y^2]^2+BR\cdot[(1-BP)\cdot x^2+(1+BP)\cdot y^2]^3+CR\cdot[(1-CP)\cdot x^2+(1+CP)\cdot y^2]^4+DR\cdot[(1-DP)\cdot x^2+(1+DP)\cdot y^2]^5;$$

in which $\Delta z$, as mentioned, describes the depth relief in mm along the coordinate z (cf. FIGS. 6, 7) at the position (x, y) and where x and y are the coordinates shown in FIGS. 6, 7 and perpendicular to the z axis. The coefficients having dimensions, AR- . . . -DR, are the rotationally symmetrical 4th, 6th, 8th and 10th order components of the deviation from the fundamental conical, in this case planar, wavefront, while the dimensionless coefficients AP- . . . -DP describe the corresponding non-rotationally symmetrical components. All coefficients are free parameters of the mathematical optimization. This then gives the optically effective phase correction function $$\Phi=(2\pi/\lambda)\cdot(n-1)\cdot\Delta z$$

using the refractive index n of the glass plate and the wavelength $\lambda$.

Optimization of the wavefront gives:
AR=0.1(E–06) mm$^{-3}$; AP=–0.61(E+00);
BR=0.1(E–09) mm$^{-5}$; BP=–0.12(E+01);
CR=0.7(E–13) mm$^{-7}$; CP=–0.12(E+01);
DR=0.2(E–16) mm$^{-9}$; DP=–0.11(E+01);
where E is the exponent.

EXAMPLE 2

On the third reflector 3, the structure function $\Delta z$ is polished into the mirror surface as a depth relief (FIG. 13). The coefficients used below have the meaning stated in Example 1. After optimization of the wavefront, the following values are obtained:
AR=0.2(E–10) mm$^{-3}$; AP=0.48(E+01);
BR=–0.1(E–14) mm$^{-5}$; BP=0.24(E+01);
CR=0.15(E–13) mm$^{-7}$; CP=0.93(E–01);
DR=0.2(E–23) mm$^{-9}$; DP=–0.31(E+01)
This then gives the actual phase correction function $$\Phi=(2\pi/\lambda)\cdot 2\cdot cos(\theta)\cdot \Delta z,$$

where $\theta$ describes the beam deflection angle relative to the mirror normal.

EXAMPLE 3

The desired phase correction function can also be produced through diffraction at a structured surface. There are various possibilities for producing a diffracting structure: In FIG. 8, the representation is used as a modified Fresnel plate. The concept is as follows: the optical phase in Example 1 could also be written as $$\Phi=(2\pi/\lambda)\cdot(n-1)\cdot\Delta z \text{ (modulo } \lambda\text{)}.$$

In this case, instead of the relief function $\Delta z$ from Example 1, the modification $\Delta z$ (modulo $\lambda$) must be polished into the transmitting carrier plate 7. If a plate designed in this way is brought into the beam path, the wavefront is corrected in the same way as in Example 1. The difference is that the underlying, physical mechanism is no longer simply the reflection but also the diffraction at these fine structures. Nevertheless, it is still true that $\Phi$ must be represented as a function of the stated coefficients AR . . . DP.

Numerous modifications are possible within the scope of the invention; for example, the correction of the aberrations caused by the tilting about the angle $\alpha$ could be made partially, for example by two correction surfaces arranged one behind the other in the beam path, which, owing to the double processing, is however not preferred although a further improvement of the image quality might be achieved therewith. Such a partial or multiple correction could also be made if, instead of mounting a reflecting film on the third reflector 5, a transmitting film is mounted on a mirror surface of the reflector 5. In this case, a first correction of the beam is effected during the first passage through the transmitting film up to the mirror surface, and a second correction of the beam during the second passage through the transmitting film after reflection by the mirror surface of the reflector 5. Of course, the correction then has to be calculated appropriately.

What is claimed is:
1. An optical system which is in the form of a telescope having a beam path which comprises the following: a first reflector (3), arranged along its axis (A), for reflecting a beam (1) incident along an optical axis (O) onto a convex second reflector (4) which throws the beam obtained from the first reflector (3) onto a third reflector (5), from which it is passed to a concave fourth reflector (6) in order to be reflected at an angle to said optical axis (O), wherein a means (5, 7) for correcting optical wavefront errors defining at least one phase-influencing surface is provided in the beam path, wherein the optical wavefront is calculated for different wavelengths and fields of view between entry pupil (EP) and exit pupil (AP), wherein reflections include rotationally symmetrical and non-rotationally symmetrical wavefront errors, and wherein the rotationally symmetrical and non-rotationally symmetrical wavefront errors included in said reflections for all wavelengths and fields of view are compensated by said at least one phase-influencing surface (5, 7) in the beam path.

2. The telescope as claimed in claim 1, wherein the axis (A) of the first reflector (3) makes an angle ($\alpha$) other than 0° with the optical axis (O).

3. The telescope as claimed in claim 2, wherein:

the angle ($\alpha$) between the axis (A) of the first reflector (3) and the optical axis (O) of the incident beam (1) is less than 30°.

4. The telescope as claimed in claim 1, wherein the correction means (5, 7) has a phase structure $\Phi=(2\pi/\lambda)\cdot a\cdot b\cdot \Delta z$ or $\Phi=(2\pi/\lambda)\cdot a\cdot b\cdot \Delta z$ (modulo $\lambda$) and wherein $$\Delta z = AR\cdot[(1-AP)\cdot x^2+(1+AP)\cdot y^2]^2 + BR\cdot[(1-BP)\cdot x^2+(1+BP)\cdot y^2]^3 + CR\cdot[(1-CP)\cdot x^2+(1+CP)\cdot y^2]^4 + DR\cdot[(1-DP)\cdot x^2+(1+DP)\cdot y^2]^5;$$

in which $\Delta z$ or $\Delta z$ (modulo $\lambda$) describes the depth profile in mm along a coordinate z at a position (x, y), a=(n−1) for a transmitting surface, wherein n is the refractive index of the correction means, and a=2 for a reflecting surface, while b is a geometry factor which determines the mounting position of the surface, x and y are the coordinates perpendicular to the z axis, wherein the coefficients AR- . . . -DR are the rotationally symmetrical 4th, 6th, 8th and 10th order components of the deviation from the fundamental conical wavefront, while the coefficients AP- . . . -DP are the corresponding non-rotationally symmetrical components.

5. The telescope as claimed in claim 1, wherein the parent mirror of the first reflector (3) an F number which is greater than 1.

6. The telescope as claimed in claim 1, wherein the parent mirror of the second reflector (4) has an F number which is greater than 1.

7. The telescope as claimed in claim 2, wherein:

the axis (A') of the second reflector (4) makes an angle ($\beta$) other than 0° with the optical axis (O); and the angle of the axis (A) of the first reflector (3) with the optical axis (O) of the incident beam (1) is substantially equal to ($\beta$); and the angle between the axis (A') of the second reflector (4) and the optical axis (O) of the incident beam (1) is less than 30°.

\* \* \* \* \*